(12) United States Patent
Lin

(10) Patent No.: US 9,715,311 B2
(45) Date of Patent: Jul. 25, 2017

(54) OVERHANGING TOUCH CONTROL SYSTEM AND TOUCH CONTROL METHOD THEREOF

(71) Applicant: Quanta Computer Inc., Taoyuan (TW)

(72) Inventor: Chien-Hung Lin, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 91 days.

(21) Appl. No.: 14/856,822

(22) Filed: Sep. 17, 2015

(65) Prior Publication Data

US 2016/0357349 A1 Dec. 8, 2016

(30) Foreign Application Priority Data

Jun. 3, 2015 (TW) .............................. 104117908 A

(51) Int. Cl.
| | | |
|---|---|---|
| *G06F 3/01* | (2006.01) | |
| *G06F 3/042* | (2006.01) | |
| *G06F 3/03* | (2006.01) | |
| *G01S 17/46* | (2006.01) | |
| *G06F 3/044* | (2006.01) | |
| *G02B 26/10* | (2006.01) | |
| *G06F 3/043* | (2006.01) | |
| *G06F 3/041* | (2006.01) | |
| *G06F 3/0354* | (2013.01) | |

(52) U.S. Cl.
CPC ........ *G06F 3/0418* (2013.01); *G06F 3/03542* (2013.01); *G06F 3/0421* (2013.01)

(58) Field of Classification Search
CPC ...... G06F 3/017; G06F 3/0421; G06F 3/0428; G06F 3/03545; G06F 3/0418; G02B 26/103
See application file for complete search history.

(56) References Cited

U.S. PATENT DOCUMENTS

| | | | |
|---|---|---|---|
| 8,515,128 B1* | 8/2013 | Hildreth .................. | G06F 3/017 345/156 |
| 2009/0309841 A1* | 12/2009 | Wilson .................. | G06F 3/0428 345/173 |
| 2009/0309853 A1* | 12/2009 | Hildebrandt .......... | G06F 3/0421 345/175 |

(Continued)

*Primary Examiner* — Lin Li
(74) *Attorney, Agent, or Firm* — McClure, Qualey & Rodack, LLP

(57) ABSTRACT

An overhanging touch control system and a method thereof are provided. The overhanging touch control system includes a touch surface, a first overhanging transceiver circuit, a second overhanging transceiver circuit, and a controller, wherein the first and second overhanging transceiver circuits are disposed at different edge positions on the touch surface, and their detection ranges overlap. The first overhanging transceiver circuit detects a first initial image upon initialization and a first real-time image after initialization. The second overhanging transceiver circuit detects a second initial image upon initialization and a second real-time image after initialization. The controller determines whether a reflective object is present at the detection range of the first overhanging transceiver circuit based on the first real-time image, and determines whether the reflective object is present at the detection range of the second overhanging transceiver circuit based on the second real-time image.

9 Claims, 13 Drawing Sheets

(56) References Cited

U.S. PATENT DOCUMENTS

| | | | | |
|---|---|---|---|---|
| 2011/0074674 A1* | 3/2011 | Walberg | ............... | G06F 3/0418 345/158 |
| 2011/0095989 A1* | 4/2011 | McGibney | .......... | G06F 3/03545 345/173 |
| 2012/0013576 A1* | 1/2012 | Chung | ................ | G02B 26/103 345/175 |
| 2012/0212454 A1* | 8/2012 | Kiyose | ................ | G06F 3/0416 345/175 |
| 2012/0256825 A1* | 10/2012 | Nakanishi | ............... | G01S 17/46 345/156 |
| 2014/0333584 A1* | 11/2014 | Chen | ................... | G06F 3/0416 345/175 |

* cited by examiner

OVERHANGING TOUCH CONTROL SYSTEM AND TOUCH CONTROL METHOD THEREOF

CROSS REFERENCE TO RELATED APPLICATIONS

This application claims priority of Taiwan Patent Application No. 104117908, filed on Jun. 3, 2015, and the entirety of which is incorporated by reference herein.

BACKGROUND OF THE INVENTION

Field of the Invention

The present invention relates to a touch control technology, and in particular to an overhanging touch control system and a touch control method thereof.

Description of the Related Art

Conventional touch control technology utilizes infrared light sources disposed around the edges of a screen to detect nearby objects. In addition, reflective stripes are arranged at 3 or 4 sides of the screen for reflecting the infrared light beams, so that when an object moves closer to or touches the screen, the infrared light beams will be blocked to form a shadow. As a consequence, infrared detectors disposed at the edges of the screen may detect the shadow to determine the position of the object.

An overhanging touch control system and a touch control method thereof are required to overcome the limitations of the reflective stripes arranged at the 3 or 4 sides of the screen in the conventional touch control technology. The overhanging touch control system is easily set up on various touch surfaces such as a television, a display, or a wall to detect an object and calculate the position thereof.

BRIEF SUMMARY OF THE INVENTION

A detailed description is given in the following embodiments with reference to the accompanying drawings.

An embodiment of an overhanging touch control system is disclosed, including a touch surface, a first overhanging transceiver circuit, a second overhanging transceiver circuit, and a controller. The first overhanging transceiver circuit and the second overhanging transceiver circuit are disposed at different edge positions on the touch surface, wherein the first overhanging transceiver circuit is configured to emit a first infrared signal to detect a first initial image upon initialization and detect a first real-time image after initialization, the second overhanging transceiver circuit is configured to emit a second infrared signal to detect a second initial image upon initialization and detect a second real-time image after initialization, and detection ranges of the first and second overhanging transceiver circuits overlap. The controller, coupled to the first and second overhanging transceiver circuits, is configured to determine a first image threshold and a second image threshold according to the first initial image and the second initial image, respectively, determine whether a reflective object is present at the detection range of the first overhanging transceiver circuit based on the first real-time image and the first image threshold, and determine whether the reflective object is present at the detection range of the second overhanging transceiver circuit based on the second real-time image and the second image threshold.

Another embodiment of a touch control method is provided, adopted by an overhanging touch control system which comprises a touch surface, a first overhanging transceiver circuit, a second overhanging transceiver circuit, and a controller, wherein the first overhanging transceiver circuit and the second overhanging transceiver circuit are respectively disposed at different edge positions on the touch surface, and detection ranges of the first and second overhanging transceiver circuits overlap, the touch control method comprising: emitting, by the first overhanging transceiver circuit, a first infrared signal to detect a first initial image upon initialization and detect a first real-time image after initialization; emitting, by the second overhanging transceiver circuit, a second infrared signal to detect a second initial image upon initialization and detect a second real-time image after initialization; determining, by the controller, a first image threshold and a second image threshold according to the first initial image and the second initial image, respectively; determining, by the controller, whether a reflective object is present at the detection range of the first overhanging transceiver circuit based on the first real-time image and the first image threshold; and determining, by the controller, whether the reflective object is present at the detection range of the second overhanging transceiver circuit based on the second real-time image and the second image threshold.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
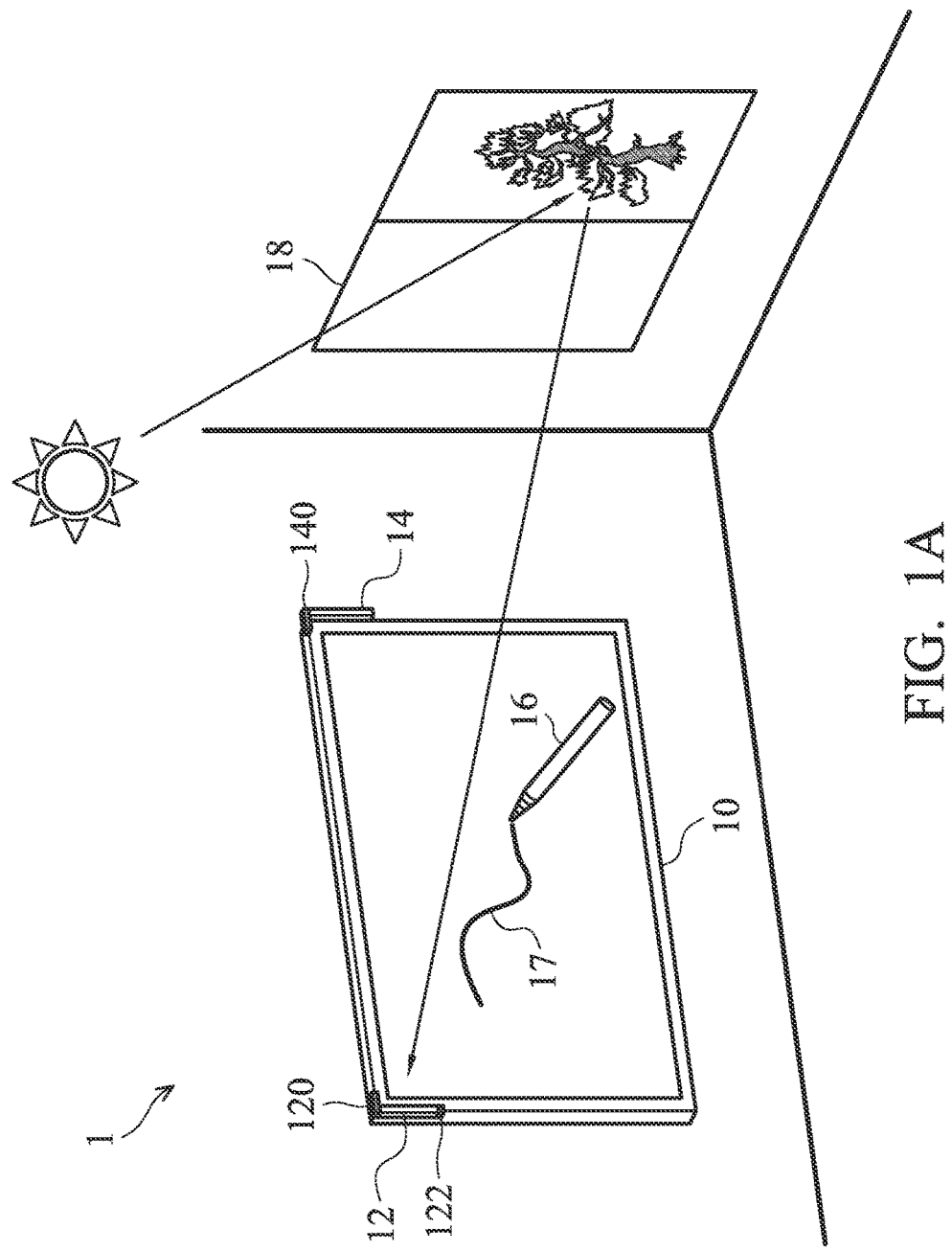
FIG. 1A is a schematic diagram of an overhanging touch control system 1 according to an embodiment of the invention.

FIG. 1A is a schematic diagram of an overhanging touch control system 1 according to an embodiment of the invention, including a touch surface 10, a first overhanging transceiver module 12, a second overhanging transceiver module 14, and a reflective pen 16. The overhanging touch control system 1 is a system which utilizes only overhanging transceiver modules to detect positions of an object, such as a written trace 17 written by the reflective pen 16. The overhanging touch control system 1 may further reduce or remove environmental interference, such as the sunlight interference from a window 18.

The first overhanging transceiver module 12 and the second overhanging transceiver module 14 may be hung or fixed at different edge positions to obtain an overlapping detection area, thereby determining the positions and traces of the reflective pen 16. Because the overhanging touch control system 1 does not require a reflective stripe to operate, the installation is more convenient, but a side effect is that the overhanging touch control system 1 is more susceptible to environmental interference. During operation, any change in the light intensity reflected from the surrounding background, such as a change in the sunlight from outside, a passenger going by, a glass, a chair, a bookstand, or another object being added to the background, or a curtain is drawn or pulled down may affect the touch control operation. As a consequence, the overhanging touch control system 1 may reduce or remove the environmental interference to estimate the positions and traces of the reflective pen 16 more accurately.

Figure 1B:
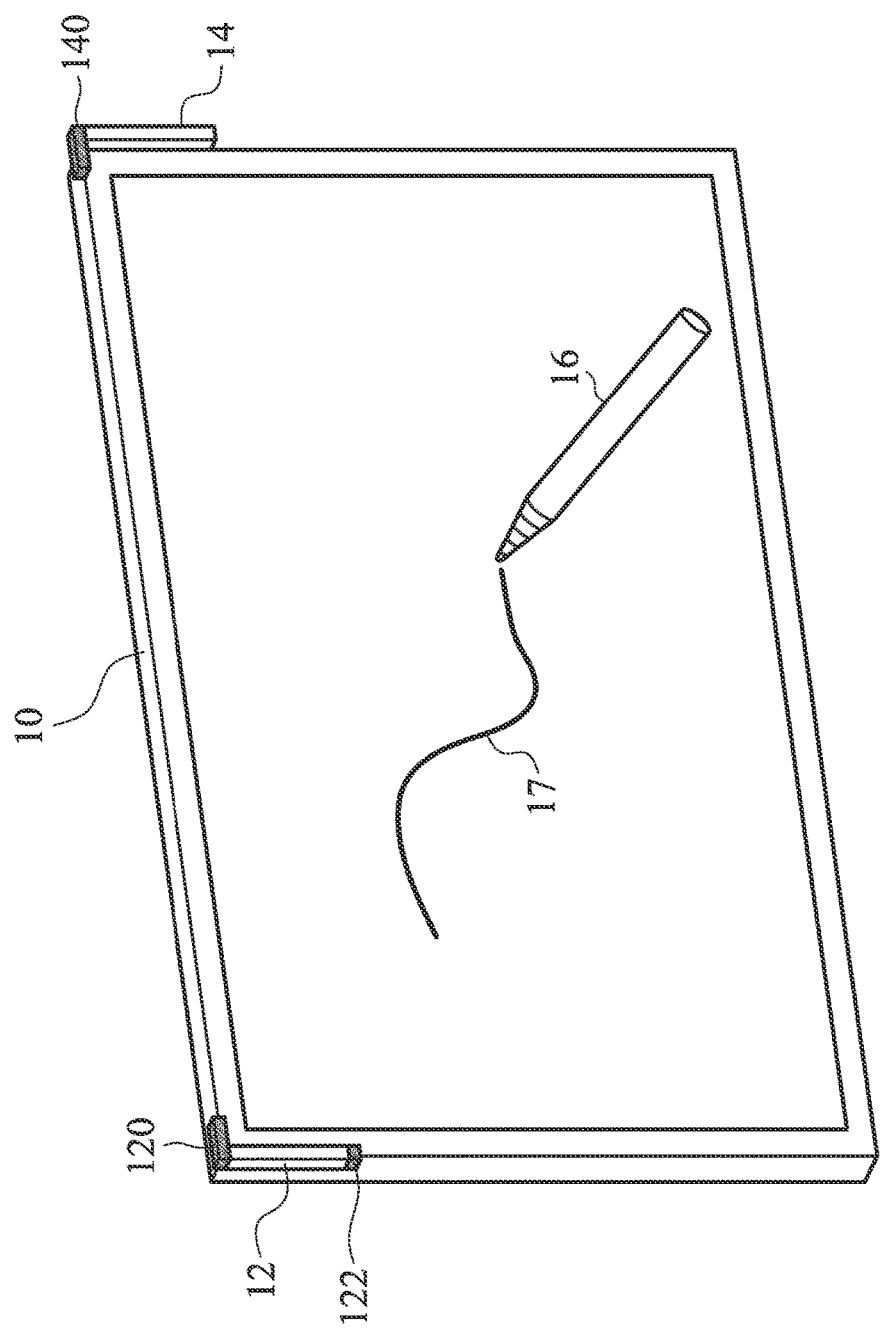
FIG. 1B is a detailed schematic diagram of a front side of the overhanging touch control system 1 according to an embodiment of the invention.

Next please refer FIG. 1B, showing a detailed schematic diagram of a front side of the overhanging touch control system 1 according to an embodiment of the invention. The touch surface 10 of the overhanging touch control system 1 may be, but is not limited to, a television, a whiteboard, or a wall. A tip of the reflective pen 16 is made by a retroreflector. When no pressure is applied to the tip of the reflective pen 16, a non-retroreflector such as a plastic cover will cover the tip, and when pressure is applied to the tip of the reflective pen 16, the retroreflector will be uncovered to substantially reflect the light back to the light source. The first overhanging transceiver module 12 and the second overhanging transceiver module 14 both contain a light source emitter and an image sensor, to emit a light beam such as an infrared light and detect a reflected light beam such as a reflected infrared light. The detection ranges of the first overhanging transceiver module 12 and the second overhanging transceiver module 14 overlap.

In the embodiment, the first overhanging transceiver module 12 and the second overhanging transceiver module 14 are disposed at the left top edge and the right top edge of the touch surface 10. The reflective pen 16 has the properties of uncovering the hidden retroreflector upon applying the reflective pen 16 to the screen. The overhanging touch control system 1 may emit the infrared light beams over the entire touch surface 10 by the light emitter of the overhanging transceiver modules, reflect the infrared light beams back to the image sensors by the retroreflector on the reflective pen 16, which is uncovered when writing the trace 17 on the touch surface 10. The overhanging touch control system 1 may utilize the two image sensors in the first overhanging transceiver module 12 and the second overhanging transceiver module 14 to locate the position coordinates of the reflected pen 16 during writing.

Specifically, the first overhanging transceiver module 12 and the second overhanging transceiver module 14 each includes a standalone housing, and the housing may contain one or more sets of light emitters and image sensors. The housing of the first overhanging transceiver module 12 contains two sets of light emitters and image sensors, referred to as overhanging transceivers 120 and 122, where the overhanging transceivers 120 and 122 are separated by a distance d such as 10 cm to monitor the detection zones in the upper section and lower section of the touch surface 10. The housing of the second overhanging transceiver module 14 contains one set of the light emitter and the image sensor, referred to as an overhanging transceiver 140. The overhanging transceiver circuits 120, 122, and 140 may independently detect position parameters of the reflective pen 16, wherein the position parameters may be relative positions of the reflective pen 16 observed from the overhanging transceivers 120, 122, and 140. FIGS. 2A, 2B, 5A, 5B, 6A, and 6B illustrate embodiments for taking the relative positions or observed angles as the position parameters, details are provided later.

After the overhanging transceiver circuits 120, 122, and 140 detect the position parameters of the reflective pen 16, the overhanging touch control system 1 may calculate position coordinates of the reflective pen 16 on the touch surface 10 by a controller (not shown) based on the position parameters detected by the overhanging transceivers 120, 122, and 140, and display the position coordinates by way such as the trace 17 on the touch surface 10. In particular, after the overhanging touch control system 1 powers up, the controller may determine first, second, and third image thresholds based on initial images detected by the overhanging transceivers 120, 122, and 140, respectively. Subsequently, after the first, second, and third image thresholds are determined, the controller may determine whether the reflective pen 16 is present in the detection range based on real-time images detected by the overhanging transceiver circuits 120, 122, and 140 and the first, second, and third image thresholds. When all of the real-time images detected by the overhanging transceiver circuits 120, 122, and 140 indicate that the reflective pen 16 is present, the controller may determine the position coordinates of the reflective pen 16 according to the real-time images detected by the overhanging transceivers 120, 122, and 140. When one of the real-time images detected by the overhanging transceiver circuits 120, 122, and 140 indicates that the reflective pen 16 is absent, the controller may update the image threshold for the overhanging transceiver which fails to detect the reflective pen 16. When all of the real-time images detected by the overhanging transceiver circuits 120, 122, and 140 indicate that the reflective pen 16 is absent, the controller may gradually update the first, second, and third image thresholds based on the real-time images detected by the overhanging transceivers 120, 122, and 140. The gradually update refers to an image threshold (background) update which occurs once every fixed time interval (e.g., every second) or every fixed number of frames (e.g., every 5 frames).

Figure 1C:
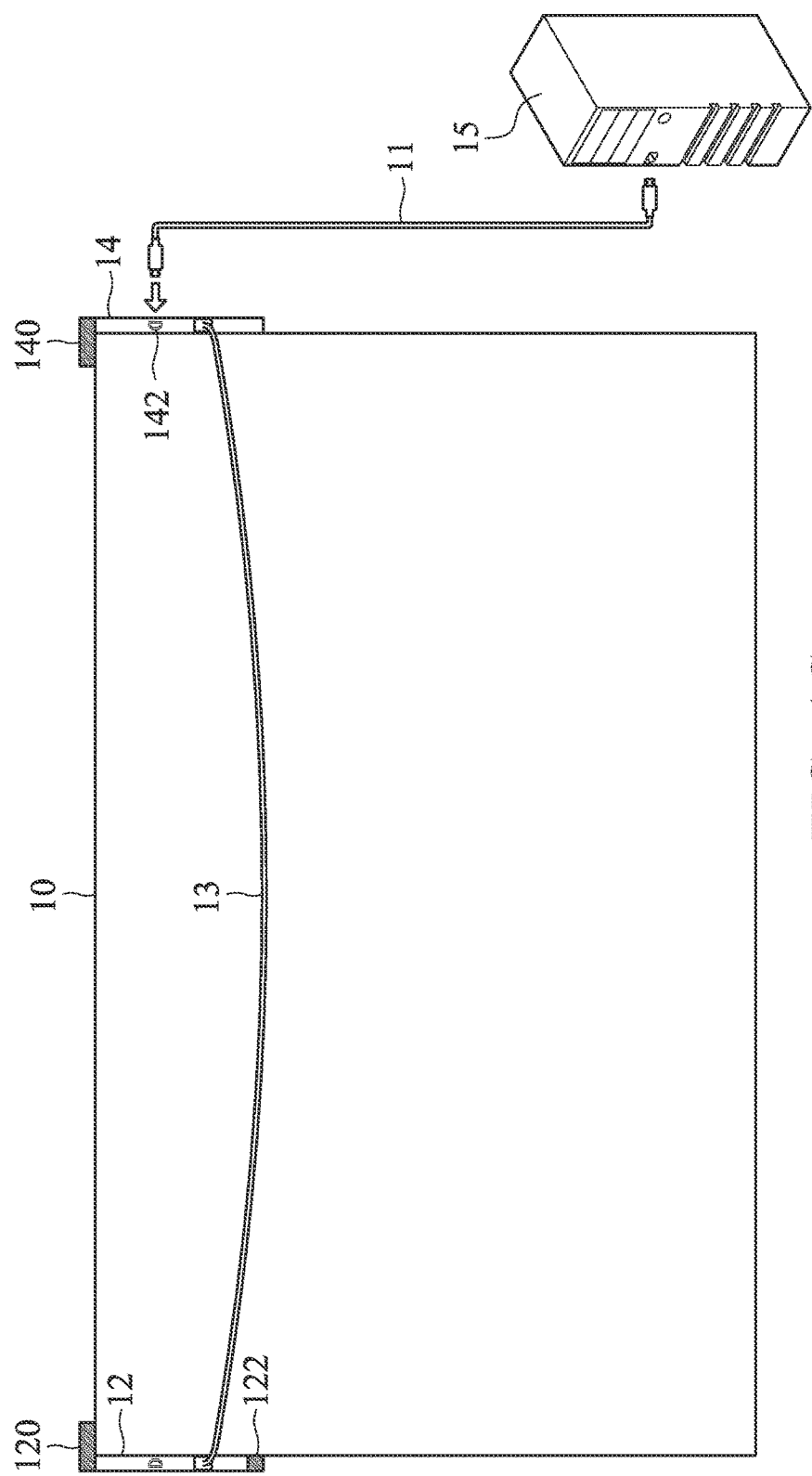
FIG. 1C is a detailed schematic diagram of a back side of the overhanging touch control system 1 according to an embodiment of the invention.

Next please refer to FIG. 1C, illustrating a detailed schematic diagram of a back side of the overhanging touch control system 1 according to an embodiment of the invention, including the touch surface 10, the first overhanging transceiver module 12, the second overhanging transceiver module 14, a transceiver module connecting line 13, an external connecting wire 11, and a host computer 15. The first overhanging transceiver module 12 includes the overhanging transceiver circuits 120 and 122, and the second overhanging transceiver module 14 includes the overhanging transceiver circuit 140 and an external plug-in 142.

The first overhanging transceiver module 12 and the second overhanging transceiver module 14 are connected to each other through the transceiver module connecting line 13, and the second overhanging transceiver module 14 and the host computer 15 are connected to each other through the external connecting wire 11, which may be a Universal Serial Bus (USB) cable. The overhanging touch control system 1 may transmit the position parameters of the reflective pen 16 detected by the overhanging transceiver circuits 120, 122, and 140 to the controller in the host computer 15 via the external connecting wire 11, thereby calculating the position coordinates of the reflective pen 16.

The architecture of the overhanging touch control system 1 is different from that of the traditional touch control system in that it is susceptible to external environmental interference without the use of reflective stripes, and consequently an anti-environmental interference method is adopted by the overhanging touch control system 1, which analyzes all possible combinations of the environmental interference to derive a background update mechanism. The controller in the host computer 15 may precisely determine the position coordinates of the reflective pen 16 based on the background update mechanism.

The overhanging touch control system 1 overcomes the traditional optical control technology which employs 3 or 4 reflective stripes at the frames, and utilizes the overhanging transceiver modules which are easily set up on various touch surfaces to detect the reflective object and calculate the positions thereof.

Figure 2A:
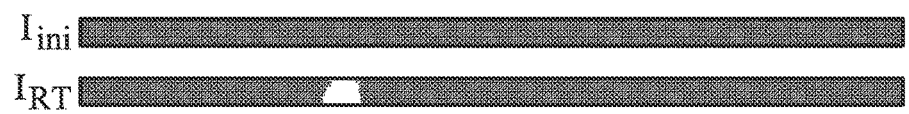
FIG. 2A is a schematic diagram of an image sensed by an overhanging transceiver circuit according to an embodiment of the invention.
Figure 2B:
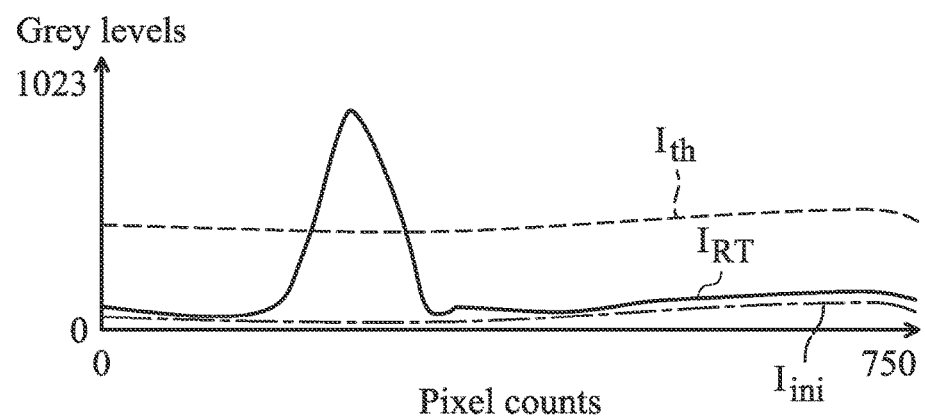
FIG. 2B is a grey scale diagram of the imaged sensed by the overhanging transceiver circuit according to an embodiment of the invention.

FIG. 2A is a schematic diagram of an image sensed by an overhanging transceiver circuit according to an embodiment of the invention, and FIG. 2B is a grey scale diagram of the imaged sensed by the overhanging transceiver circuit according to an embodiment of the invention.

Referring to FIG. 2A, upon initialization of the overhanging touch control system 1, the overhanging transceiver circuits 120, 122, and 140 may firstly determine background images $I_{ini}$. Initially the reflective pen 16 has not yet touched the touch surface 10, thus the background images $I_{ini}$ is a clean image; whereas when the reflective pen 16 is applied to the touch surface 10 for writing, the overhanging transceivers circuit 120, 122, or 140 may determine a bright spot on a real-time image $I_{RT}$ by the image sensor of the overhanging transceiver circuit 120, 122, or 140, wherein the bright spot moves together with the reflective pen 16. The background image $I_{ini}$ and the real-time image $I_{RT}$ are 750 pixels×6 pixels image frames. The overhanging transceiver circuit 120, 122, or 140 may transmit the real-time image $I_{RT}$ which includes the position of the bright spot in the image frame as the position parameter to the controller.

Next referring to FIG. 2B, upon power-up, the controller in the host computer 15 may receive the background image $I_{ini}$ from the overhanging transceiver circuits 120, 122, and 140 and compute the threshold image $I_{th}$ according to the background image $I_{ini}$. In some embodiments, the controller may multiply the brightness of each pixel in the background image $I_{ini}$ by a predetermined coefficient to obtain a threshold image $I_{th}$, wherein the predetermined coefficient exceeds 1 and may be, for example, 1.1. That is, $I_{th}=1.1 \times I_{ini}$. When the threshold image $I_{th}$ is obtained and a user is using the reflective pen 16, the controller may compare the real-time image $I_{RT}$ received from the overhanging transceiver circuit 120, 122, or 140 to the threshold image $I_{th}$, and only when the real-time image $I_{RT}$ exceeds the threshold image $I_{th}$, the controller may determine that the reflective pen 16 is detected and determine the position coordinates of the reflective pen 16 according to the portion where the real-time image $I_{RT}$ exceeds the threshold image $I_{th}$. For example, the controller may determine the portion that the real-time image $I_{RT}$ exceeds the threshold image $I_{th}$, and calculate a center of gravity of the portion exceeding the threshold image $I_{th}$ as the position coordinates of the reflective pen 16.

Figure 5A:
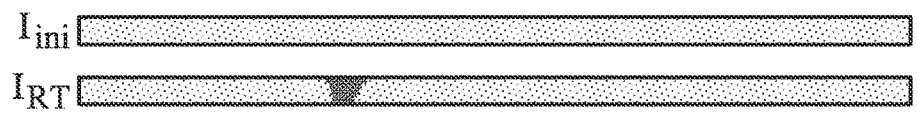
FIG. 5A is a schematic diagram of an image sensed by an overhanging transceiver circuit according to another embodiment of the invention.
Figure 5B:
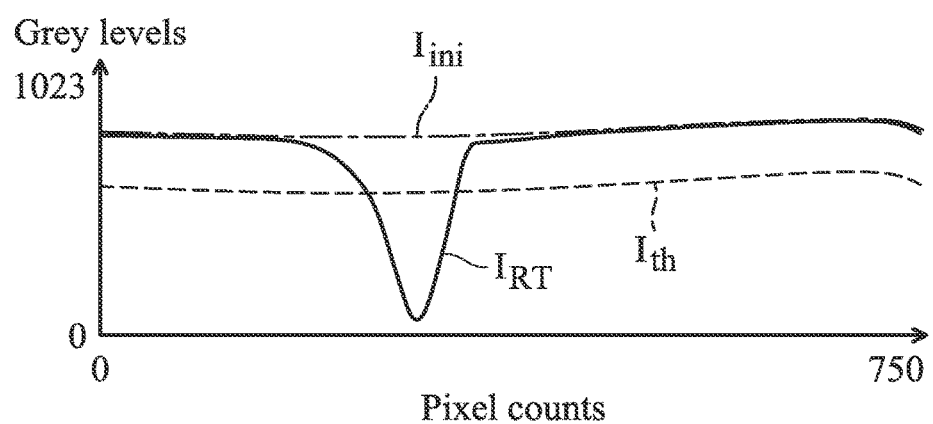
FIG. 5B is a grey scale diagram of the imaged sensed by the overhanging transceiver circuit according to another embodiment of the invention.

FIGS. 5A and 5B are a schematic diagram of an image sensed by an overhanging transceiver circuit and a grey scale diagram of the imaged sensed by the overhanging transceiver circuit according to another embodiment of the invention, respectively.

To support certain image processing techniques and algorithms, in some embodiments, the images may be inverted in advance, as indicated in FIG. 5A. Upon power-up of the overhanging touch control system 1, the overhanging transceiver circuit 120, 122, or 140 may firstly detect inverted background images $I_{ini}$. Initially the reflective pen 16 has not yet touched the touch surface 10, thus the background image $I_{ini}$ is a clean image; when the reflective pen 16 is applied to the touch surface 10 for writing, the overhanging transceiver circuit 120, 122, or 140 may determine a shadow spot on a real-time image $I_{RT}$ by the image sensor of the overhanging transceiver circuit 120, 122, or 140, wherein the shadow spot moves together with the reflective pen 16. The background image $I_{ini}$ and the real-time image $I_{RT}$ are 750 pixels×6 pixels image frames. The overhanging transceiver circuit 120, 122, or 140 may transmit the real-time image $I_{RT}$ which includes the position of the shadow spot in the image frame as the position parameter to the controller.

Next referring to FIG. 5B, upon power-up, the controller in the host computer 15 may receive the background image $I_{ini}$ from the overhanging transceivers circuit 120, 122, or 140 and compute the threshold image $I_{th}$ according to the background image $I_{ini}$. In some embodiments, the controller may multiply the brightness of each pixel in the background image $I_{ini}$ by a predetermined coefficient to obtain a threshold image $I_{th}$, wherein the predetermined coefficient is less than 1 and may be, for example, 0.85. That is, $I_{th}=0.85 \times I_{ini}$. When the threshold image $I_{th}$ is obtained and a user is using the reflective pen 16, the controller may compare the real-time image $I_{RT}$ received from the overhanging transceiver circuit 120, 122, or 140 to the threshold image $I_{th}$. Only when the real-time image $I_{RT}$ is less than the threshold image $I_{th}$, the controller may determine that the reflective pen 16 is detected and determine the position coordinates of the reflective pen 16 according to the portion where the real-time image $I_{RT}$ is less the threshold image $I_{th}$. For example, the controller may determine the portion where the real-time image $I_{RT}$ is less than the threshold image $I_{th}$, and calculate a gravity of the portion less than the threshold image $I_{th}$ as the position coordinates of the reflective pen 16.

The overhanging touch control methods disclosed in FIGS. 2A, 2B, 5A, and 5B overcome the limitations of the traditional optical touch technology which employs 3 or 4 reflective stripes, and utilize the overhanging transceiver modules which are easily set up on various touch surfaces to detect the reflective object and calculate the positions thereof.

Figure 3:
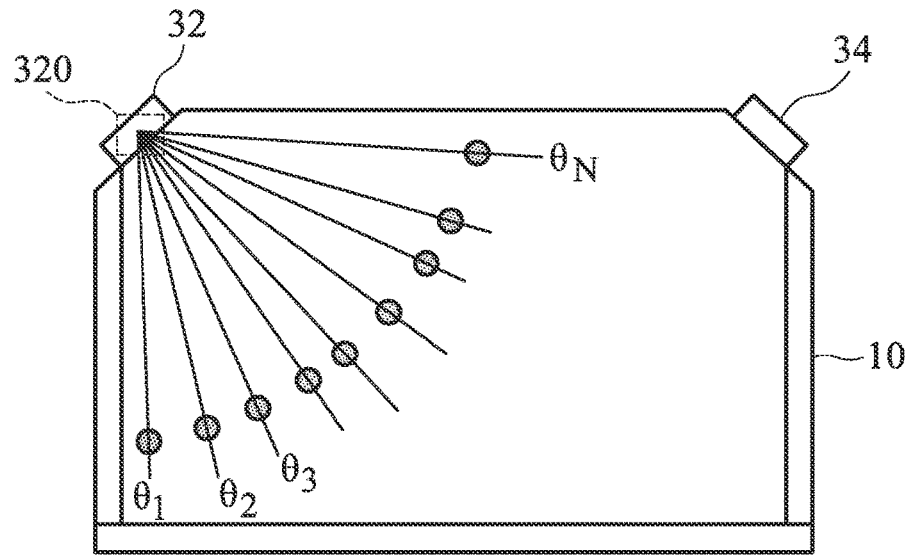
FIG. 3 is a schematic diagram of an angle calibration method 3 according to an embodiment of the invention.

FIG. 3 is a schematic diagram of an angle calibration method 3 according to an embodiment of the invention. After the overhanging touch control system 1 is installed, a user may use the angle calibration method 3 to calibrate the overhanging touch control system 1. The controller in the host computer 15 may employ the angle calibration method 3 to establish an angle database for the overhanging transceiver circuits 120, 122, and 140, wherein the angle database includes angles versus corresponding pixels.

Upon startup of the angle calibration method 3, initially calibration points are placed at several known angles of the touch surface 10. For example, press the reflective pen 16 at the position of θ1. Next the overhanging touch control system 1 may record the corresponding pixel position on the image sensor for each calibration point. For example, the angle θ1 corresponds to the 70 to 80 pixels of the 750 pixels on the image sensor of the overhanging transceiver circuit 120. By calibrating other angles θ2, θ3, . . . , θn according to the above two steps, the angle calibration method 3 may establish the angle database for various angles versus corresponding pixels on the image sensor.

Figure 4:
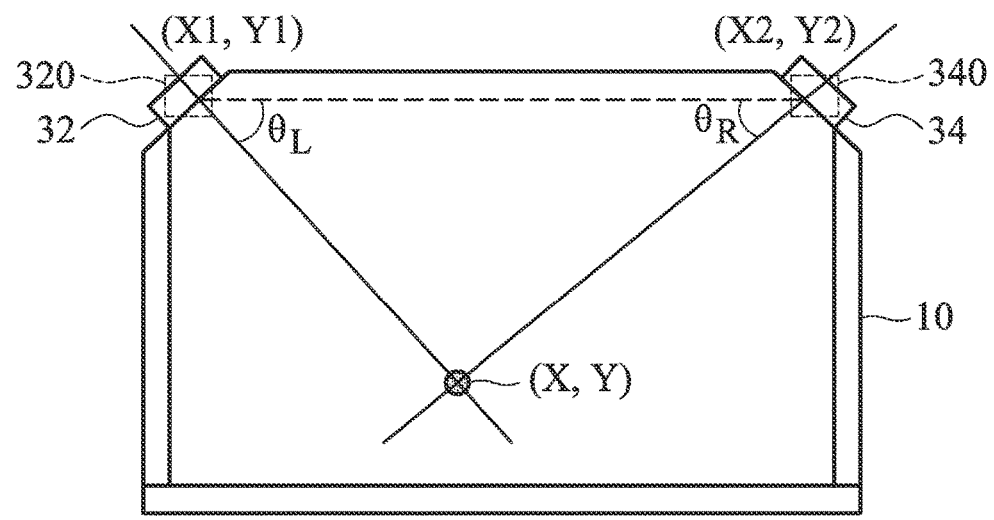
FIG. 4 is a schematic diagram of a coordinate calculation method 4 according to an embodiment of the invention.

FIG. 4 is a schematic diagram of a coordinate calculation method 4 according to an embodiment of the invention. The coordinate calculation method 4 is used to calculate the position coordinates of the reflective pen 16 according to the angle database established in angle calibration method 3.

The controller of the host computer 15 may utilize the coordinate calculation method 4 to calculate the position coordinates of the reflective pen 16 according to the position parameters detected by the overhanging transceiver circuits 120, 122, and 140. After installing the overhanging transceiver module 32 and the overhanging transceiver module 34, a user may configure a distance between the overhanging transceiver module 32 and the overhanging transceiver module 34, or coordinates of the overhanging transceiver module 32 and the overhanging transceiver module 34 into the controller of the host computer 15.

When the reflective pen 16 is writing on the touch surface 10, an image will be produced on certain pixels of the image sensor of the overhanging transceiver circuit, the controller may determine the angle of the reflective pen 16 based on the real-time images detected by the image sensors and the angle database generated in the previous calibration. For instance, the controller may determine that the angle of the reflective pen 16 is θL based on the real-time image detected by the image sensor of the overhanging transceiver circuit 320, and determine that the angle of the reflective pen 16 is θR based on the real-time image detected by the image sensor of the overhanging transceiver circuit 340.

Since the controller already knows the coordinates (X1, Y1) of the overhanging transceiver circuit 340 and the coordinates (X2, Y2) of the overhanging transceiver circuit 342, also knows the angle observed from the overhanging transceiver circuits 340 and 342 are θL and θR, thus the position coordinates (X, Y) of the reflective pen 16 may be computed using basic mathematics (trigonometry or linear equations).

Figure 6A:
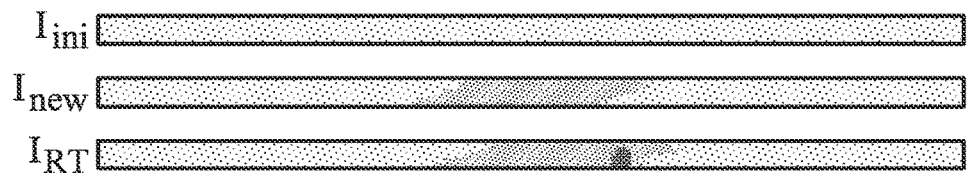
FIG. 6A is a schematic diagram of a interfered image sensed by an overhanging transceiver circuit.
Figure 6B:
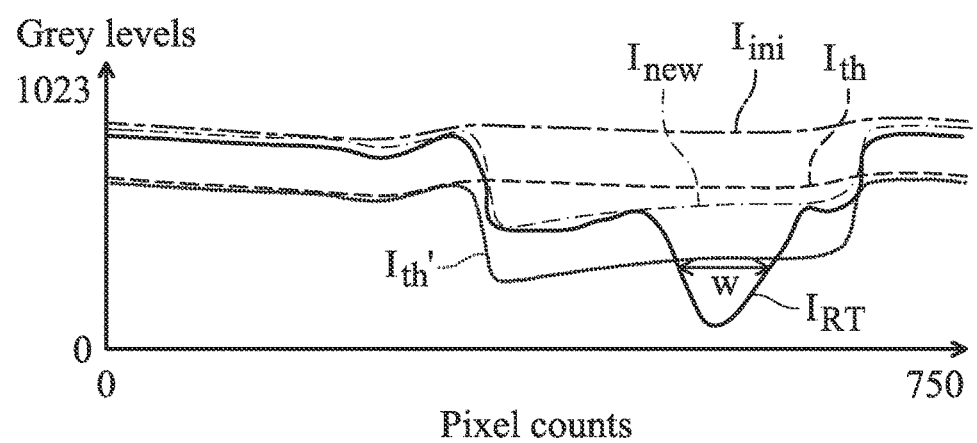
FIG. 6B shows a schematic of a background update method according to an embodiment of the invention.

FIG. 6A is a schematic diagram of a interfered image sensed by an overhanging transceiver circuit. As shown in FIG. 6, the background image $I_{ini}$ is produced by the initial image after initialization, however, during the subsequent operation, a newly entered object or a change in the surrounding environment causes a patch of shadow to appear in the real-time image Inew, the patch of shadow will be present in the real-time image $I_{RT}$ of the reflective pen 16 and affect how the controller computes the location of the reflective pen, resulting in misjudging the position of the reflective pen 16 to the left of the real position. FIG. 6B shows a schematic of a background update method according to an embodiment of the invention, correcting the background interference.

As shown in FIG. 6B, upon startup, the controller in the host computer 15 may receive the background image $I_{ini}$ from the overhanging transceiver circuit 120, 122, or 140 and calculate the threshold image $I_{th}$ using the background image e.g., multiply the inverted background image $I_{ini}$' by 0.9 to obtain the threshold image $I_{th}$, or $I_{th}=0.9 \times I_{ini}$. When the newly entered object or the change in the surrounding environment creates a patch of shadow in the real-time image Inew, the controller may update a new threshold image $I_{th}$' according to the new background image Inew, e.g., multiply the inverted new background image Inew' by 0.9 to obtain the new threshold image $I_{th}$', or $I_{th}'=0.9 \times$Inew. Later when a user applies the reflective pen 16 to the new background, the controller may compare the real-time image $I_{RT}$ received from the overhanging transceiver circuit 120, 122, or 140 to the updated threshold image $I_{th}$'. Only when the real-time image $I_{RT}$ is less than the updated threshold $I_{th}$, should the controller determine that the reflective pen 16 is detected and calculate the position coordinates of the reflective pen 16 according to the portion where the real-time image $I_{RT}$ is less than the updated threshold image $I_{th}$'. Because the shadowed patch in the updated threshold image $I_{th}$ is less than the shadowed patch in the real-time image $I_{RT}$, the controller may only detect the shadow spot in the real-time image $I_{RT}$ without detecting the shadowed patch in the real-time image. As a consequence, the controller may accurately estimate the position coordinates of the reflective pen 16 by calculating the gravity of the portion where the real-time image $I_{RT}$ is less than the updated threshold image $I_{th}$'.

The background update method in FIGS. 6A and 6B may be adopted by the overhanging touch control system 1, determining changes of lights in the surrounding environment by the overhanging transceiver module and updating the threshold image according to the new background image, thereby accurately estimating the position coordinates of the reflective object.

Table 1 shows all possible conditions for the overhanging transceiver circuits 120, 122, and 140 according to an embodiment of the invention, adopted by the controller to determine the timing for initiating a background update method. The background update method may resolve the issue of the environmental interference, and is explained together accompanying FIGS. 7 through 15. Firstly the principle of the background update method is briefly explained: 1. when both the main overhanging transceiver circuits 120 and 140 on the left and right detect the images at substantially the same time, the controller may calculate the position coordinates; 2. when only one of the main overhanging transceiver circuits 120 and 140 on the left and right detects the image, the controller may calculate the position coordinates; 3. when both the main overhanging transceiver circuits 120 and 140 on the left and right cannot detect the images, the controller may perform a gradual background update to overcome the change in the brightness of the surrounding environment. The gradual background update is a background update in a fixed time interval (such as every second) or a fixed number of frames (such as every 5 frames).

TABLE 1

| Condition | Overhanging transceiver circuit 120 (Left up) | Overhanging transceiver circuit 140 (Right up) | Overhanging transceiver circuit 122 (Left down) | Background update |
| --- | --- | --- | --- | --- |
| Condition 1 | o | o | o | No |
| Condition 2 | o | o | x | No |
| Condition 3 | o | x | o | Yes |
| Condition 4 | x | o | o | Yes |
| Condition 5 | x | x | o | Yes |
| Condition 6 | x | o | x | Yes |
| Condition 7 | o | x | x | Yes |
| Condition 8 | x | x | x | gradual |

Figure 7:
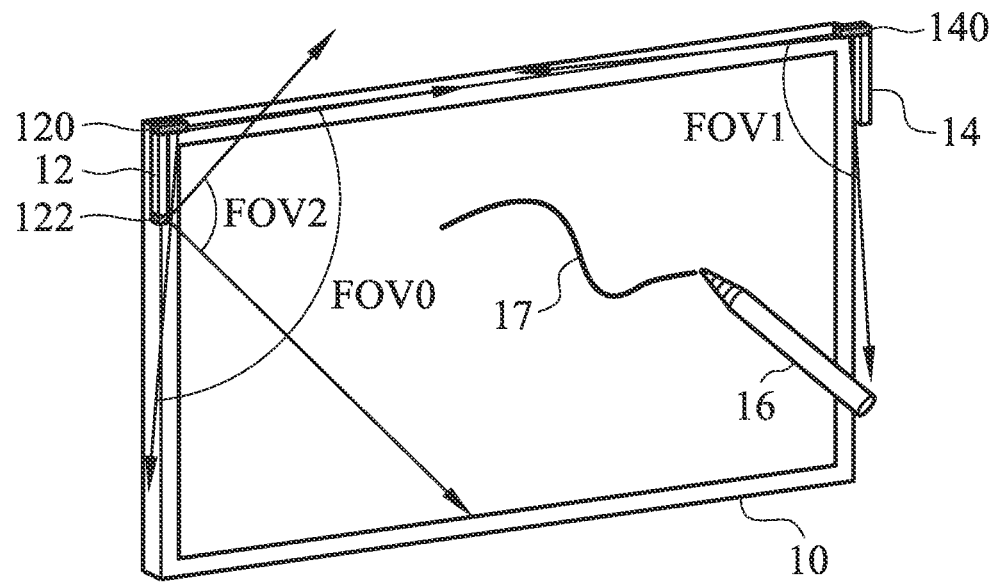
FIG. 7 shows a schematic diagram of an overhanging touch control condition 7 according to an embodiment of the invention.

Please refer FIG. 7, showing a schematic diagram of an overhanging touch control condition 7 according to an embodiment of the invention, corresponding to the condition 1 in Table 1. The overhanging transceiver circuits 120, 122, and 140 all detect the reflective pen 16. The detection ranges of the overhanging transceiver circuits 120, 122, and 140 are slightly different and overlapping, wherein the detection range of the overhanging transceiver circuits 120, 122, and 140 are labeled FOV0, FOV2, and FOV1. When all the overhanging transceiver circuits 120, 122, and 140 may detect the reflective pen 16, this indicates that the nearby object and surrounding environment do not affect the detection of the reflective pen 16, and the background update is not required. The controller may determine the position coordinates of the reflective pen 16 and generate the trace 17 according to the initial threshold images Ith and the real-time image detected by the overhanging transceiver circuits 120, 122, and 140.

Figure 8:
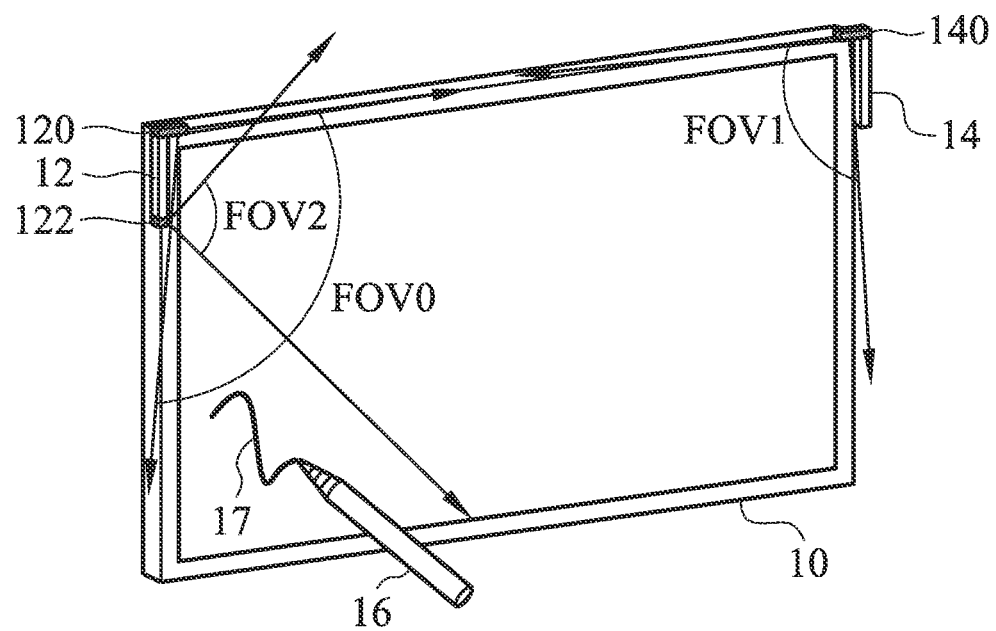
FIG. 8 shows a schematic diagram of an overhanging touch control condition 8 according to an embodiment of the invention.

FIG. 8 shows a schematic diagram of an overhanging touch control condition 8 according to an embodiment of the invention, corresponding to the condition 2 in Table 1. Both the main overhanging transceiver circuits 120 and 140 detect the reflective pen 16 and the auxiliary overhanging transceiver circuit 122 at the bottom left does not detect the reflective pen 16. As shown in FIG. 8, the position of the reflection 16 is at the bottom left of the touch surface 10, in the detection ranges of the main overhanging transceiver circuits 120 and 140 and outside of the detection range of the auxiliary overhanging transceiver circuit 122. Therefore the controller is not required to update the background even though the reflective pen 16 is outside of the detection range of the auxiliary overhanging transceiver circuit 122, and may determine the position coordinates of the reflective pen 16 and generate the trace 17 according to the initial threshold images Ith and the real-time image detected by the overhanging transceiver circuits 120 and 140.

FIG. 8 shows a schematic diagram of an overhanging touch control condition 8 according to an embodiment of the invention, corresponding to the condition 2 in Table 1. Both the main overhanging transceiver circuits 120 and 140 detect the reflective pen 16 and the auxiliary overhanging transceiver circuit 122 at the bottom left does not detect the reflective pen 16. As shown in FIG. 8, the position of the reflection 16 is at the bottom left of the touch surface 10, in the detection ranges of the main overhanging transceiver circuits 120 and 140 and outside of the detection range of the auxiliary overhanging transceiver circuit 122. Therefore the controller is not required to update the background even though the reflective pen 16 is outside of the detection range of the auxiliary overhanging transceiver circuit 122, and may determine the position coordinates of the reflective pen 16 and generate the track 17 according to the initial threshold images $I_{th}$ and the real-time image detected by the overhanging transceiver circuits 120 and 140.

Figure 9:
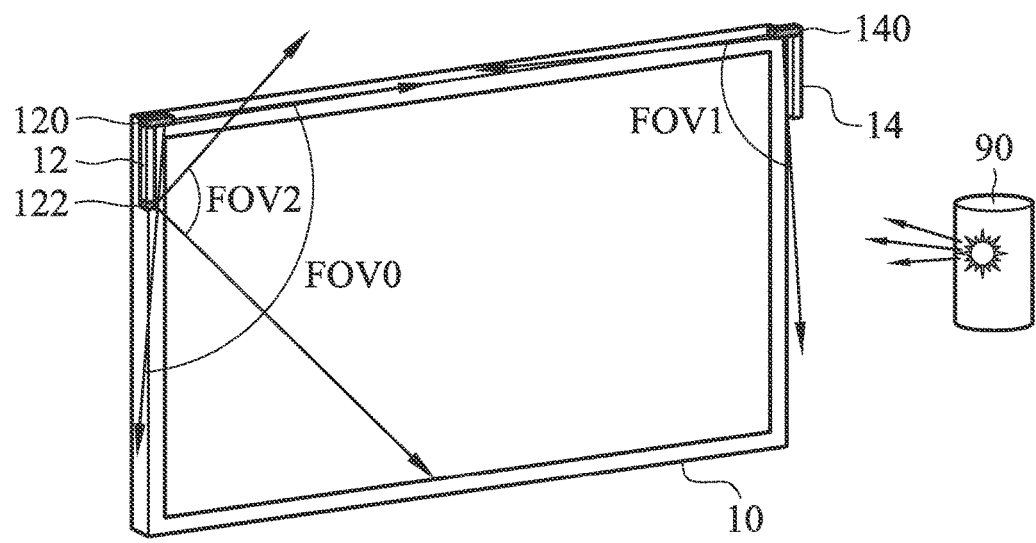
FIG. 9 shows a schematic diagram of an overhanging touch control condition 9 according to an embodiment of the invention.

FIG. 9 shows a schematic diagram of an overhanging touch control condition 9 according to an embodiment of the invention, corresponding to the condition 3 in Table 1. Both the overhanging transceiver circuits 120 and 122 at the upper left and lower left can detect the reflective object 90 and the overhanging transceiver circuit 140 at the upper right does not detect the reflective object 90. As indicated in FIG. 9, the reflective object 90 at the right of the touch surface 10 may produce a reflected light which may be detected by the overhanging transceiver circuits 120 and 122 but not the overhanging transceiver circuit 140. In order to prevent the controller from misjudging the position of the reflective pen 16 due to the reflected light from the reflective object 90, the controller must update the backgrounds for the overhanging transceiver circuits 120 and 122 but not for the overhanging transceiver circuit 140. The initial background in the following includes the initial threshold image $I_{th}$ determined according to the initial background; and the background update includes updating the new background threshold image $I_{th}'$. When applying the reflective 16, the controller may determine the position coordinates of the reflective pen 16 according to the updated background of the overhanging transceiver circuits 120 and 122 and the initial background of the overhanging transceiver circuit 140, and the real-time images detected by the overhanging transceiver circuits 120, 122, and 140.

Figure 10:
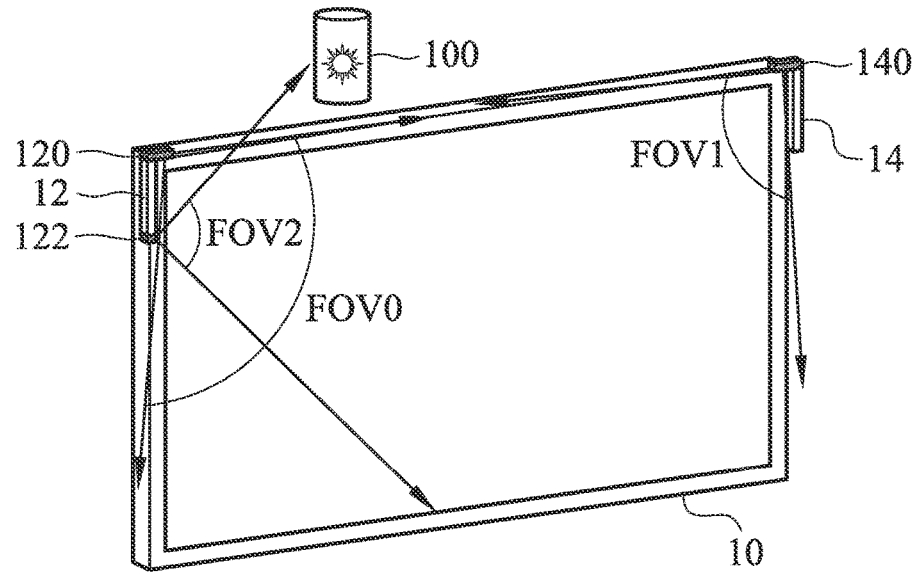
FIG. 10 shows a schematic diagram of an overhanging touch control condition 10 according to an embodiment of the invention.

FIG. 10 shows a schematic diagram of an overhanging touch control condition 10 according to an embodiment of the invention, corresponding to the condition 4 in Table 1. Both the overhanging transceiver circuits 122 and 140 at the lower left and upper right can detect the reflective object 100 and the overhanging transceiver circuit 120 at the upper left cannot detect the reflective object 100. As indicated in FIG. 10, the reflective object 100 right at the top of the touch surface 10 may produce a reflected light which may be detected by the overhanging transceiver circuits 122 and 140 but not the overhanging transceiver circuit 120. In order to prevent the controller from misjudging the position of the reflective pen 16 due to the reflected light from the reflective object 100, the controller must update the backgrounds for the overhanging transceiver circuits 122 and 140 but not for the overhanging transceiver circuit 120. When applying the reflective 16, the controller may determine the position coordinates of the reflective pen 16 according to the updated background of the overhanging transceiver circuits 122 and 140 and the initial background of the overhanging transceiver circuit 120, and the real-time images detected by the overhanging transceiver circuits 120, 122, and 140.

Figure 11:
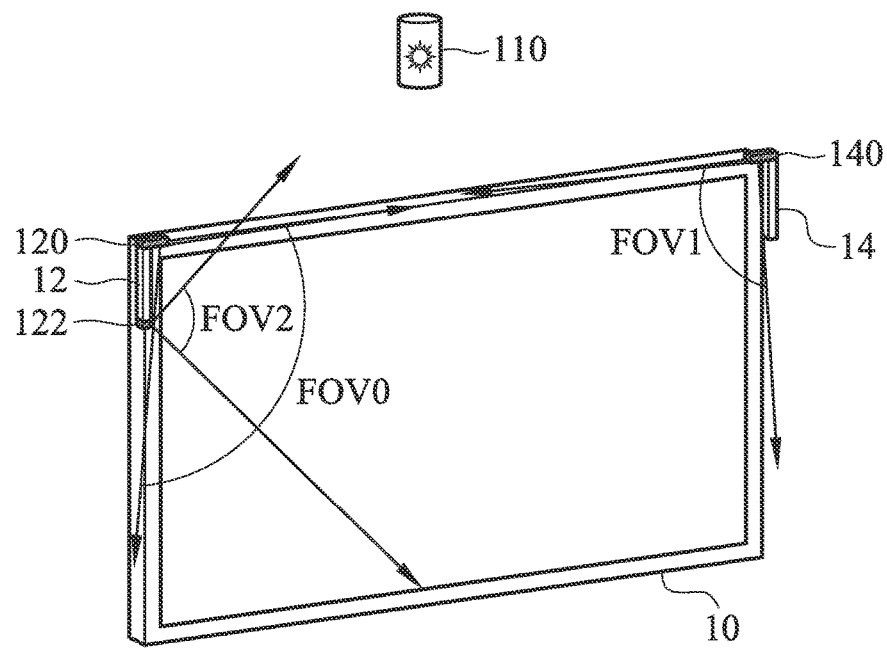
FIG. 11 shows a schematic diagram of an overhanging touch control condition 11 according to an embodiment of the invention.

FIG. 11 shows a schematic diagram of an overhanging touch control condition 11 according to an embodiment of the invention, corresponding to the condition 5 in Table 1.

Both the overhanging transceiver circuits 122 and 140 at the lower left and upper right cannot detect the reflective object 110 and the overhanging transceiver circuit 120 at the upper left can detect the reflective object 110. As indicated in FIG. 11, the reflective object 110 far from the top of the touch surface 10 may produce a reflected light which may be detected by the overhanging transceiver circuit 122 but not the overhanging transceiver circuits 120 and 140. In order to prevent the controller from misjudging the position of the reflective pen 16 due to the reflected light from the reflective object 110, the controller must update the backgrounds for the overhanging transceiver circuit 122 but not for the overhanging transceiver circuits 120 and 140. When applying the reflective pen 16, the controller may determine the position coordinates of the reflective pen 16 according to the updated background of the overhanging transceiver circuit 122 and the initial backgrounds of the overhanging transceiver circuits 120 and 140, and the real-time images detected by the overhanging transceiver circuits 120, 122, and 140.

Figure 12:
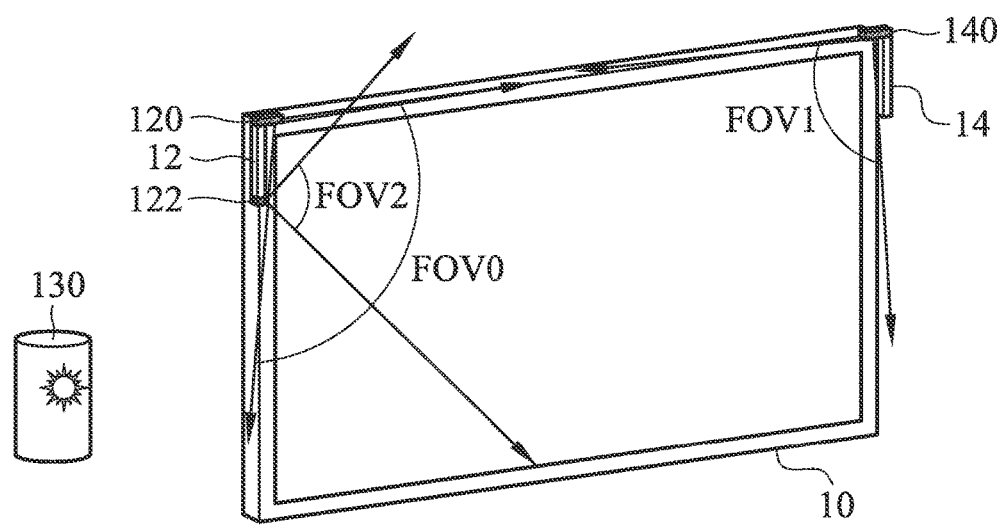
FIG. 12 shows a schematic diagram of an overhanging touch control condition 12 according to an embodiment of the invention.

FIG. 12 shows a schematic diagram of an overhanging touch control condition 12 according to an embodiment of the invention, corresponding to the condition 6 in Table 1. The overhanging transceiver circuit 140 at the upper right can detect the reflective object 130 and the overhanging transceiver circuits 120 and 122 at the upper left and lower left cannot detect the reflective object 130. As indicated in FIG. 12, the reflective object 130 at the left of the touch surface 10 may produce a reflected light which may be detected by the overhanging transceiver circuit 140 but not the overhanging transceiver circuits 120 and 122. In order to prevent the controller from misjudging the position of the reflective pen 16 due to the reflected light from the reflective object 130, the controller must update the backgrounds for the overhanging transceiver circuit 140 but not for the overhanging transceiver circuits 120 and 122. When applying the reflective 16, the controller may determine the position coordinates of the reflective pen 16 according to the updated background of the overhanging transceiver circuit 140 and the initial backgrounds of the overhanging transceiver circuits 120 and 122, and the real-time images detected by the overhanging transceiver circuits 120, 122, and 140.

Figure 13:
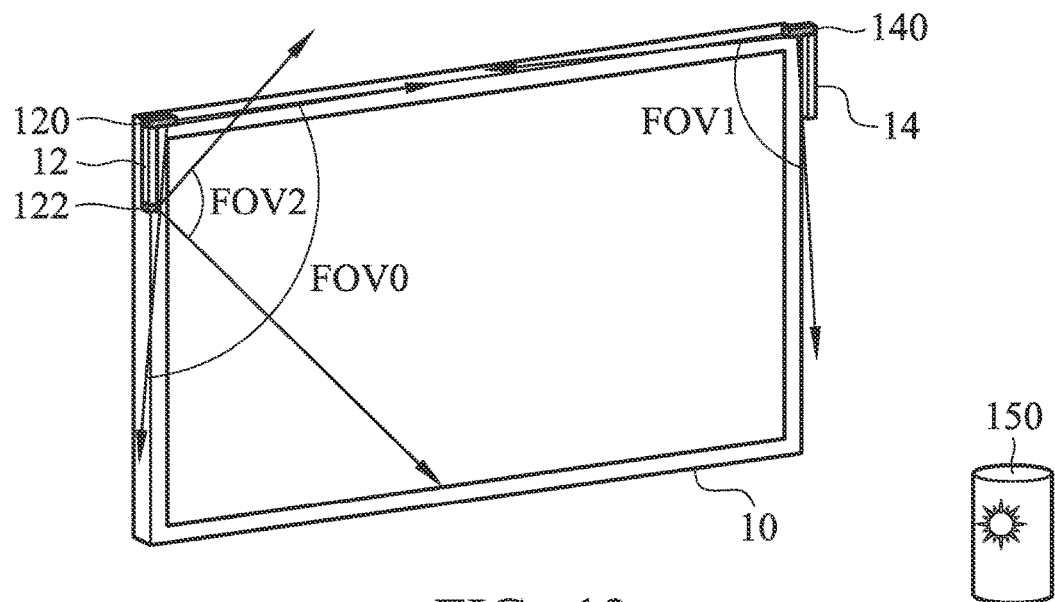
FIG. 13 shows a schematic diagram of an overhanging touch control condition 13 according to an embodiment of the invention.

FIG. 13 shows a schematic diagram of an overhanging touch control condition 13 according to an embodiment of the invention, corresponding to the condition 7 in Table 1. The overhanging transceiver circuit 120 at the upper left can detect the reflective object 150 and the overhanging transceiver circuits 122 and 140 at the upper left and lower right cannot detect the reflective object 150. As indicated in FIG. 13, the reflective object 130 at the left of the touch surface 10 may produce a reflected light which may be detected by the overhanging transceiver circuit 140 but not the overhanging transceiver circuits 120 and 122. In order to prevent the controller from misjudging the position of the reflective pen 16 due to the reflected light from the reflective object 150, the controller must update the backgrounds for the overhanging transceiver circuit 120 but not for the overhanging transceiver circuits 122 and 140. When applying the reflective 16, the controller may determine the position coordinates of the reflective pen 16 according to the updated background of the overhanging transceiver circuit 120 and the initial backgrounds of the overhanging transceiver circuits 120 and 140, and the real-time images detected by the overhanging transceiver circuits 120, 122, and 140.

Figure 14:
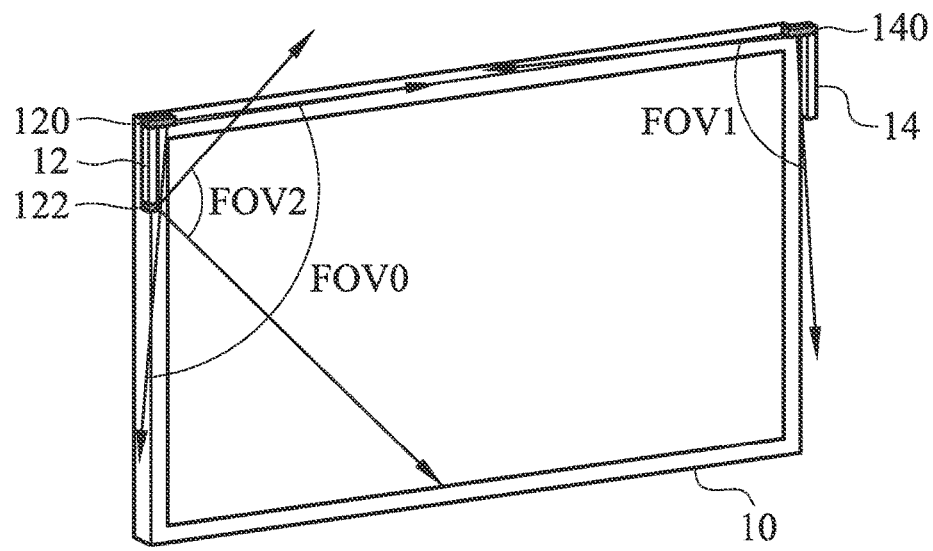
FIG. 14 shows a schematic diagram of an overhanging touch control condition 14 according to an embodiment of the invention.

FIG. 14 shows a schematic diagram of an overhanging touch control condition 14 according to an embodiment of the invention, corresponding to the condition 8 in Table 1. All of the overhanging transceiver circuits 120, 122 and 140 cannot detect the anything, thus the controller performs the gradual background update for the overhanging transceiver circuits 120, 122 and 140 to overcome the change in the brightness of the surrounding environment. The gradual background update refers to a background update that occurs once every fixed time interval (e.g., every second) or every fixed number of frames (e.g., every 5 frames). When applying the reflective 16, the controller may determine the position coordinates of the reflective pen 16 according to the updated backgrounds of the overhanging transceiver circuits 120, 122 and 140, and the real-time images detected by the overhanging transceiver circuits 120, 122, and 140.

Figure 15A:
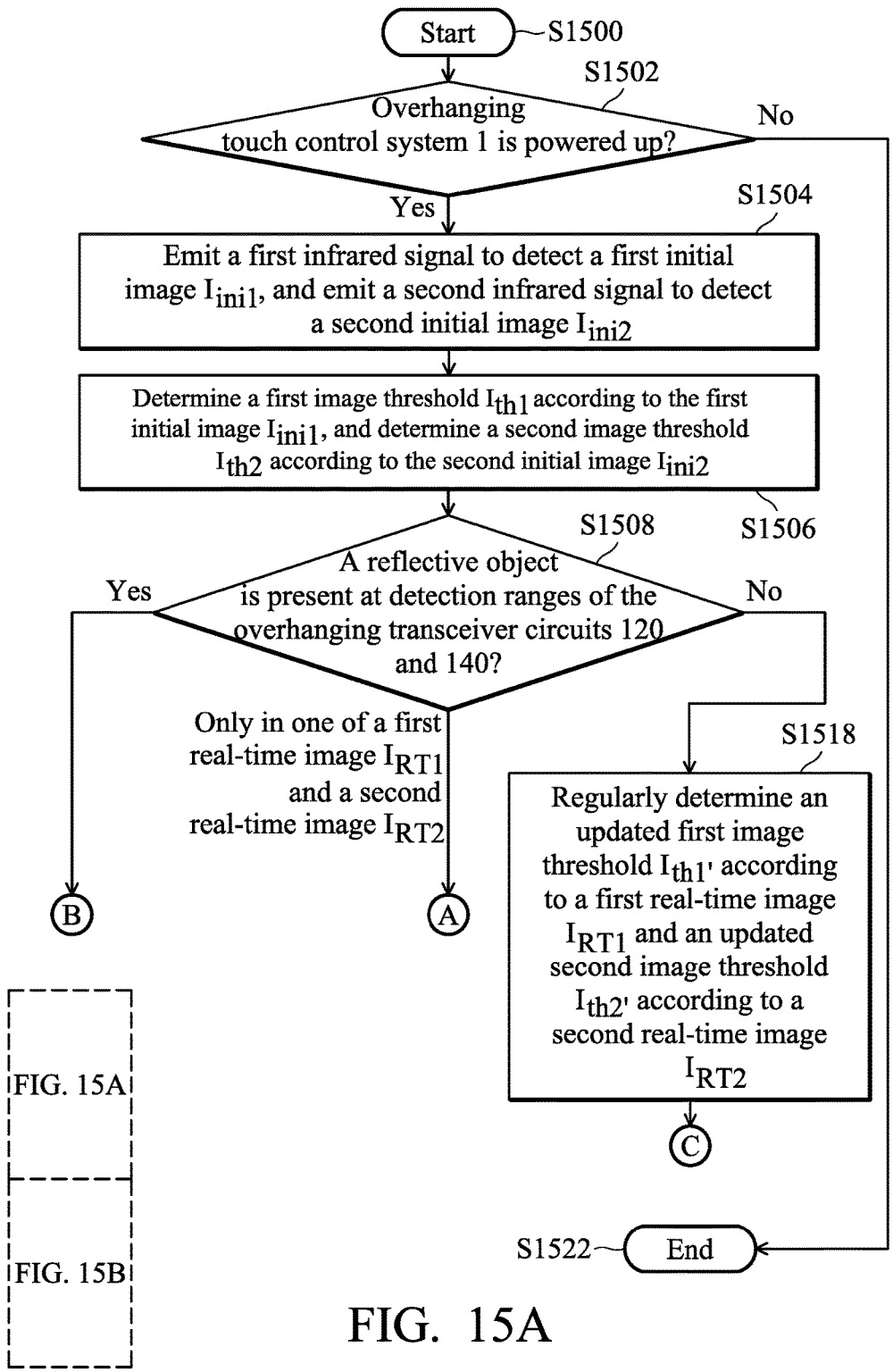
FIGS. 15A and 15B are flowcharts of an overhanging touch control method according to an embodiment of the invention.
Figure 15B:
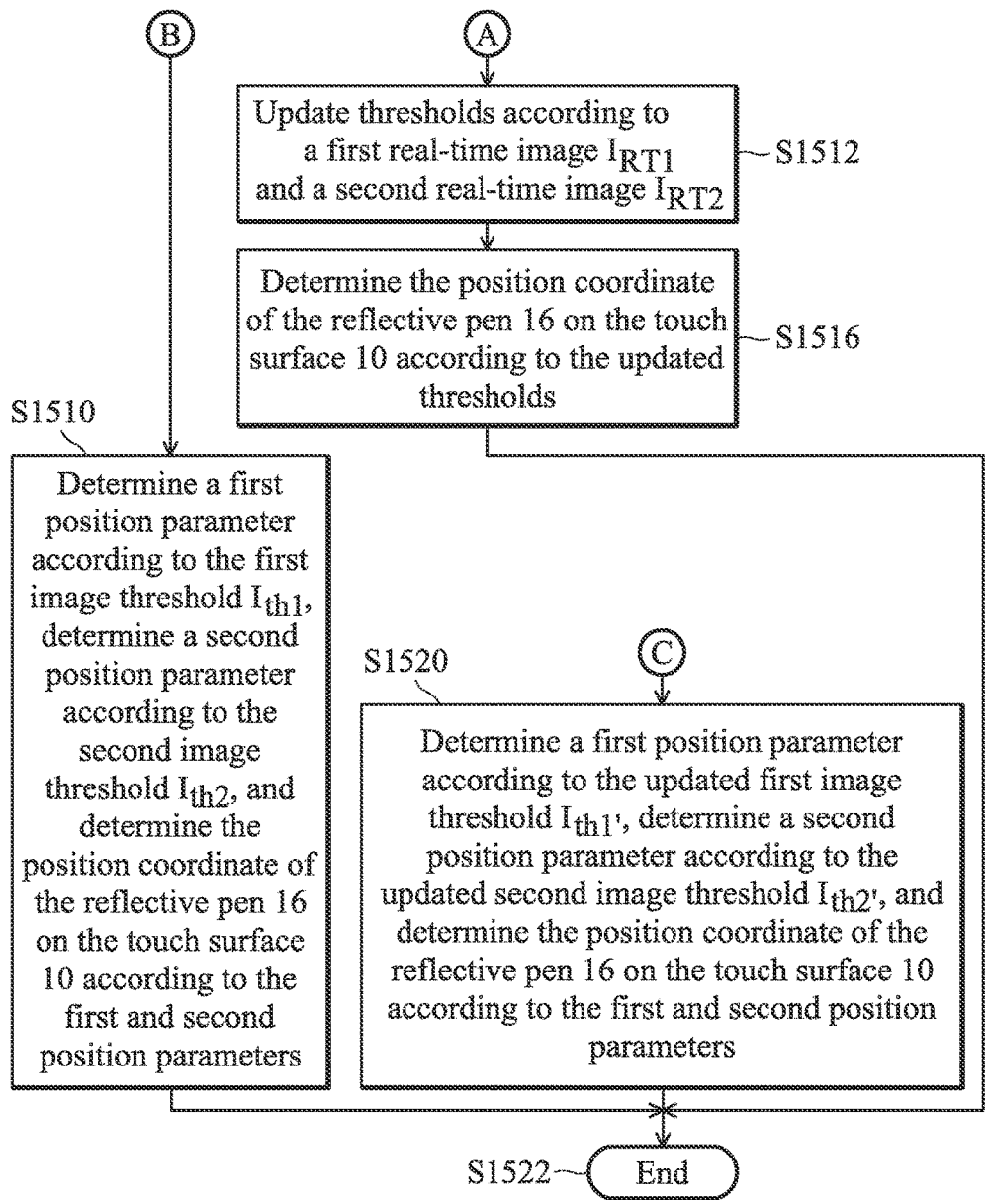

FIGS. 15A and 15B are flowcharts of an overhanging touch control method according to an embodiment of the invention, adopted by the overhanging touch control system 1 in FIGS. 1A, 1B, and 1C. For brevity, the overhanging touch control method 15 will be explained by the overhanging transceiver circuits 120 and 140 at the upper left and the upper right of the overhanging touch control system 1 but not the overhanging transceiver circuit 122 at the bottom left. Since the overhanging transceiver circuit 122 at the bottom left is only used to assist detecting the object at the upper section of the touch surface 10, thus it will not affect the operation principle of the overhanging touch control method. The overhanging touch control method may be implemented by hardware circuits in the controller or software codes executable by the controller. After the host computer powers on, the overhanging touch control method may be initiated automatically (S1500).

Firstly the overhanging touch control method may determine whether the overhanging touch control system 1 is powered up (S1502). For example, the connection line 11 has been plugged into the host computer in FIG. 1C, it would determine that the overhanging touch control system 1 is powered up. If the overhanging touch control system 1 has not been powered on, the overhanging touch control method may be terminated immediately (S1555); whereas if the overhanging touch control system 1 has been powered on, the overhanging touch control method may activate the upper left overhanging transceiver circuits 120 of the overhanging touch control system 1 to emit the first infrared signal to detect the first initial image Iini1 and activate the upper right overhanging transceiver circuits 140 of the overhanging touch control system 1 to emit the second infrared signal to detect the second initial image Iini2 (S1504), determine the first image threshold Ith1 according to the first initial image Iini1, and determine the second image threshold Ith2 according to the second initial image Iini2 (S1506). After the first image threshold Ith1 and the second image threshold Ith2 are determined, the overhanging touch control method 15 may receive the first real-time image IRT1 and the second real-time image IRT2 from the overhanging transceiver circuits 120 and 140, respectively, compare the first real-time image IRT1 to the first image threshold Ith1 to determine whether any object is present at the detection range of the overhanging transceiver circuit 120, and compare the second real-time image IRT2 to the second image threshold Ith2 to determine whether any object is present at the detection range of the overhanging transceiver circuit 140 (S1508). The comparison method for comparing the first real-time image IRT1 to the first image threshold Ith1 and the second real-time image IRT2 to the second image threshold Ith2 are explained in the preceding paragraphs for FIGS. 2A, 2B, 5A, 5B, 6A, and 6B.

When the overhanging touch control method determines that the object is present in the first real-time image IRT1 and the second real-time image IRT2, it indicates that both the left overhanging transceiver circuit 120 and the right overhanging transceiver circuit 140 detect the object, the overhanging touch control method 15 may compare the first real-time image IRT1 to the first image threshold Ith1 to determine a first position parameter, compare the second real-time image IRT2 to the second image threshold Ith2 to determine a second position parameter, and determine the position coordinates of the reflective pen 16 on the touch surface 10 according to the first position parameter and the second position parameter (S1510). The first position parameter and the second position parameter may be the positions of the object observed by the left overhanging transceiver circuit 120 and the right overhanging transceiver circuit 140, respectively. The overhanging touch control method may employ the position estimation method in FIG. 4 to find angles corresponding to the positions from the angle database and calculate the position coordinates of the object according to the distance between the left overhanging transceiver circuit 120 and the right overhanging transceiver circuit 140, and the angles observed by the left overhanging transceiver circuit 120 and the right overhanging transceiver circuit 140.

When the overhanging touch control method determines that the object is present in one of the first real-time image IRT1 and the second real-time image IRT2, this indicates that only one of the left overhanging transceiver circuit 120 and the right overhanging transceiver circuit 140 detects the object. The detected object may be a reflective object in the surrounding environment, thus the overhanging touch control method may eliminate the interference caused by the reflected light of the reflective object by updating the background. Consequently, the overhanging touch control method may update the image threshold of the one of the overhanging transceiver circuit 120 and 140 which detects the object and may not update the image threshold of the other one of the overhanging transceiver circuit 120 and 140 which detects no object (S1512). In particular, the overhanging touch control method may update the image threshold of the overhanging transceiver circuit 120 or 140 according to the threshold update method described in FIGS. 6A and 6B. For instance, when the overhanging transceiver circuit 120 detects an object and the overhanging transceiver circuit 140 detects no object, the overhanging touch control method may update the first update image threshold Ith1' based on the first image IRT1 without updating the second image threshold Ith2. After the threshold is updated, the overhanging touch control method may determine the position coordinates of the reflective pen 16 according to the first update image threshold Ith1' and the second image threshold Ith2 (S1516).

When the overhanging touch control method determines that no object is present in the first real-time image IRT1 and the second real-time image IRT2, it indicates that neither the left overhanging transceiver circuit 120 nor the right overhanging transceiver circuit 140 detect the object, the overhanging touch control method may perform the gradual background update to update the first image threshold Ith1 and the second image threshold Ith2 (S1518). For example, the first updated image threshold Ith1' is determined according to the first real-time image IRT1 and the second updated image threshold Ith2' is determined according to the second real-time image IRT2 every second or every 5th frame. After the image threshold is updated, the overhanging touch control method may determine the position coordinates of the reflective pen 16 according to the first update image threshold Ith1' and the second updated image threshold Ith2' (S1520).

The touch control method 15 in FIGS. 15A and 15B may be adopted by the overhanging optical touch control system 1, determining the image thresholds according to the initial images detected by the overhanging optical transceiver modules, and determine an appropriate timing for updating the image thresholds based on the real-time images detected by the overhanging optical transceiver modules, thereby accurately estimating the position coordinates of the reflective object.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, processor, microprocessor or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An overhanging touch control system, comprising:
a touch surface;
a first overhanging transceiver circuit and a second overhanging transceiver circuit, respectively disposed at different edge positions on the touch surface, wherein the first overhanging transceiver circuit is configured to emit a first infrared signal to detect a first initial image upon initialization and detect a first real-time image after initialization, the second overhanging transceiver circuit is configured to emit a second infrared signal to detect a second initial image upon initialization and detect a second real-time image after initialization, and detection ranges of the first and second overhanging transceiver circuits overlap; and
a controller, coupled to the first and second overhanging transceiver circuits, configured to determine a first image threshold and a second image threshold according to the first initial image and the second initial image, respectively, determine whether a reflective object is present at the detection range of the first overhanging transceiver circuit based on the first real-time image and the first image threshold, and determine whether the reflective object is present at the detection range of the second overhanging transceiver circuit based on the second real-time image and the second image threshold;
wherein when the reflective object is absent in the detection range of the first overhanging transceiver circuit and the detection range of the second overhanging transceiver circuit, the controller is configured to periodically update the first image threshold to a fourth image threshold according to the first real-time image, and periodically update the second image threshold to a fifth image threshold according to the second real-time image.

2. The overhanging touch control system of claim 1, wherein when the reflective object is present in the detection range of the first overhanging transceiver circuit and the detection range of the second overhanging transceiver circuit, the controller is configured to determine a first position parameter for the reflective object according to the first image threshold, determine a second position parameter for the reflective object according to the second image threshold, and determine position coordinates of the reflective object on the touch surface according to the first position parameter and the second position parameter.

3. The overhanging touch control system of claim 2, wherein when the first position parameter and the second position parameter are respectively a first angle and a second angle; and
the controller is configured to determine the position coordinates of the reflective object on the touch surface based on the first angle and the second angle.

4. The overhanging touch control system of claim 1, wherein when the reflective object is present in one of the detection range of the first overhanging transceiver circuit and the detection range of the second overhanging transceiver circuit, the controller is configured to determine an updated image threshold based on an interfered image detected by one of the first overhanging transceiver circuit and the second overhanging transceiver circuit, and determine position coordinates of the reflective object on the touch surface according to the updated image threshold.

5. The overhanging touch control system of claim 1, further comprising a third overhanging transceiver circuit, disposed at the same edge of the touch surface as the first overhanging transceiver circuit or the second overhanging transceiver circuit, configured to emit a third infrared signal to detect a third initial image upon initialization and detect a third real-time image after initialization, wherein a detection range of the third overhanging transceiver circuit and the detection ranges of the first and second overhanging transceiver circuits overlap,
wherein the controller, coupled to the third overhanging transceiver circuit, is configured to determine a third image threshold according to the third initial image, and determine whether the reflective object is present at the detection range of the third overhanging transceiver circuit based on the third real-time image and the third image threshold.

6. The overhanging touch control system of claim 1, wherein the reflective object is a reflective pen made by a retroreflector.

7. The overhanging touch control system of claim 1, wherein when the controller is configured to multiply the first initial image by a fixed coefficient to obtain the first image threshold, and multiply the second initial image by the fixed coefficient to obtain the second image threshold.

8. A touch control method, adopted by an overhanging touch control system which comprises a touch surface, a first overhanging transceiver circuit, a second overhanging transceiver circuit, and a controller, wherein the first overhanging transceiver circuit and the second overhanging transceiver circuit are respectively disposed at different edge positions on the touch surface, and detection ranges of the first and second overhanging transceiver circuits overlap, the touch control method comprising:
emitting, by the first overhanging transceiver circuit, a first infrared signal to detect a first initial image upon initialization and detect a first real-time image after initialization;
emitting, by the second overhanging transceiver circuit, a second infrared signal to detect a second initial image upon initialization and detect a second real-time image after initialization;
determining, by the controller, a first image threshold and a second image threshold according to the first initial image and the second initial image, respectively;
determining, by the controller, whether a reflective object is present at the detection range of the first overhanging transceiver circuit based on the first real-time image and the first image threshold; and
determining, by the controller, whether the reflective object is present at the detection range of the second overhanging transceiver circuit based on the second real-time image and the second image threshold;
wherein when the reflective object is absent in the detection range of the first overhanging transceiver circuit and the detection range of the second overhanging transceiver circuit, the controller further periodically updates the first image threshold to a fourth image threshold according to the first real-time image and periodically updates the second image threshold to a fifth image threshold according to the second real-time image by the controller.

9. The touch control method of claim 8, further comprising:
when the reflective object is present in the detection range of the first overhanging transceiver circuit and the detection range of the second overhanging transceiver circuit, determining, by the controller, a first position parameter for the reflective object according to the first image threshold, determining, by the controller, a second position parameter for the reflective object according to the second image threshold, and determining, by the controller, position coordinates of the reflective object on the touch surface according to the first position parameter and the second position parameter.

* * * * *